US012681413B2

(12) United States Patent
Suzuki

(10) Patent No.: US 12,681,413 B2
(45) Date of Patent: Jul. 14, 2026

(54) FIXING APPARATUS

(71) Applicant: CANON KABUSHIKI KAISHA, Tokyo (JP)

(72) Inventor: Takafumi Suzuki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/648,891

(22) Filed: Apr. 29, 2024

(65) Prior Publication Data

US 2024/0377775 A1 Nov. 14, 2024

(30) Foreign Application Priority Data

May 10, 2023 (JP) ................................. 2023-077715

(51) Int. Cl.
*G03G 15/20* (2006.01)

(52) U.S. Cl.
CPC ..... *G03G 15/2053* (2013.01); *G03G 15/2064* (2013.01); *G03G 2215/2032* (2013.01)

(58) Field of Classification Search
CPC ........... G03G 15/2053; G03G 15/2064; G03G 2215/2032
See application file for complete search history.

(56) References Cited

U.S. PATENT DOCUMENTS 5,826,141 A * 10/1998 Mitsuya ............. G03G 15/2064 399/328
6,725,010 B1 * 4/2004 Parker ................ G03G 15/2039 219/216
2006/0291892 A1 * 12/2006 Jang ................... G03G 15/2053 399/328
2006/0291925 A1 * 12/2006 Kim ................... G03G 15/2053 399/333
2007/0048044 A1 * 3/2007 Tokuhiro ............. G03G 15/206 399/329
2009/0092423 A1 * 4/2009 Shin ................... G03G 15/2064 399/329
2010/0142985 A1 * 6/2010 Minbe .................. G03G 15/161 399/314

(Continued)

FOREIGN PATENT DOCUMENTS

JP 2002268414 A 9/2002
JP 2015118258 A 6/2015
JP 2019008110 A 1/2019

*Primary Examiner* — Sevan A Aydin
(74) *Attorney, Agent, or Firm* — Canon U.S.A., Inc. IP Division

(57) ABSTRACT

A fixing apparatus to fix a toner image on a recording material includes a heating unit, a pressure member, a support member, a pressing mechanism, and an insulating member. The heating unit includes a heating member having a conductive layer, a coil having a helical structure portion having a helical axis substantially parallel to a longitudinal direction of the heating member, and a core to induce magnetic lines of force of an alternating magnetic field generated by the coil. The pressure member is in contact with a heating member outer circumferential surface and forms a nip portion between the pressure member and the heating member. The insulating member electrically interrupts a conductive path to prevent formation of the conductive path that is in a loop-shape surrounding the coil and passing through the support member and the pressing mechanism when viewed in an axial direction of the helical axis.

3 Claims, 9 Drawing Sheets

(56) References Cited

U.S. PATENT DOCUMENTS

| | | | | |
|---|---|---|---|---|
| 2011/0236092 | A1* | 9/2011 | Kanai | G03G 15/2032 399/331 |
| 2013/0302046 | A1* | 11/2013 | Monde | G03G 15/2017 399/33 |
| 2014/0064755 | A1* | 3/2014 | Mogi | G03G 21/1685 399/329 |
| 2014/0255064 | A1* | 9/2014 | Suzuki | G03G 15/2028 399/329 |
| 2017/0205743 | A1* | 7/2017 | Kamiya | G03G 15/2053 |
| 2017/0219971 | A1* | 8/2017 | Kamiya | G03G 15/2053 |
| 2017/0269521 | A1* | 9/2017 | Takeda | G03G 15/2053 |
| 2022/0075296 | A1* | 3/2022 | Kitano | G03G 15/2057 |

* cited by examiner

PRESSING STATE

PRESSING RELEASE STATE

PRESSING STATE

PRESSING RELEASE STATE

FIXING APPARATUS

BACKGROUND

Field

The present disclosure relates to a fixing apparatus mounted on an electrophotographic recording type image forming apparatus, such as a printer or a copier, and particularly relates to a fixing apparatus using an induction heating system that uses electromagnetic induction to generate an induced current in a rotating body to cause the rotating body in contact with a recording material to generate heat.

Description of the Related Art

Among fixing apparatuses for fixing a toner image formed on a recording material onto the recording material is one using an induction heating system. Japanese Patent Application Laid-Open No. 2015-118258 discusses a fixing apparatus using an induction heating system, and the fixing apparatus is configured to prevent generation of an induced current circuit in a metal stay disposed inside a cylindrical belt.

When a conventional induction heating system is adopted as a fixing device, a design is required to suppress the generation of an induction current at a place other than a rotating body for fixing.

SUMMARY

The present disclosure is directed to providing a fixing apparatus that prevents an induced current circuit from being generated in a support member (frame) of the fixing apparatus.

According to an aspect of the present invention, a fixing apparatus to fix a toner image on a recording material, the fixing apparatus includes a heating unit including a heating member, a coil, and a core, wherein (i) the heating member is in a cylindrical form and has a conductive layer, (ii) the coil is disposed in a space inside the heating member, has a helical structure portion having a helical axis substantially parallel to a longitudinal direction of the heating member, and is configured to generate an alternating magnetic field to generate an induced current in the conductive layer, and (iii) the core is disposed in a space inside the helical structure portion and is configured to induce magnetic lines of force of the alternating magnetic field, a pressure member configured to be in contact with an outer circumferential surface of the heating member and form a nip portion between the pressure member and the heating member to nip and convey the recording material, a support member configured to be conductive includes a U-shaped opening that supports the heating unit and the pressure member, a pressing mechanism configured to be supported by the support member and press one of the heating unit or the pressure member toward the other of the heating unit or the pressure member to form the nip portion; and an insulating member configured to electrically interrupt a conductive path to prevent formation of the conductive path that is in a loop-shape surrounding the coil and passing through the support member and the pressing mechanism when viewed in an axial direction of the helical axis.

Further features of the present disclosure will become apparent from the following description of exemplary embodiments (with reference to the attached drawings).

DESCRIPTION OF THE EMBODIMENTS

Hereinafter, the best mode for implementing the present disclosure will be described in detail by exemplary embodiments with reference to the drawings. The dimensions, materials, shapes, relative positions, and the like of the constituent components described in the exemplary embodiments should be appropriately changed according to a configuration of an apparatus to which the present disclosure is applied and various conditions, and the scope of the present disclosure is not limited to the following exemplary embodiments.

Configuration of Image Forming Apparatus

Figure 1:
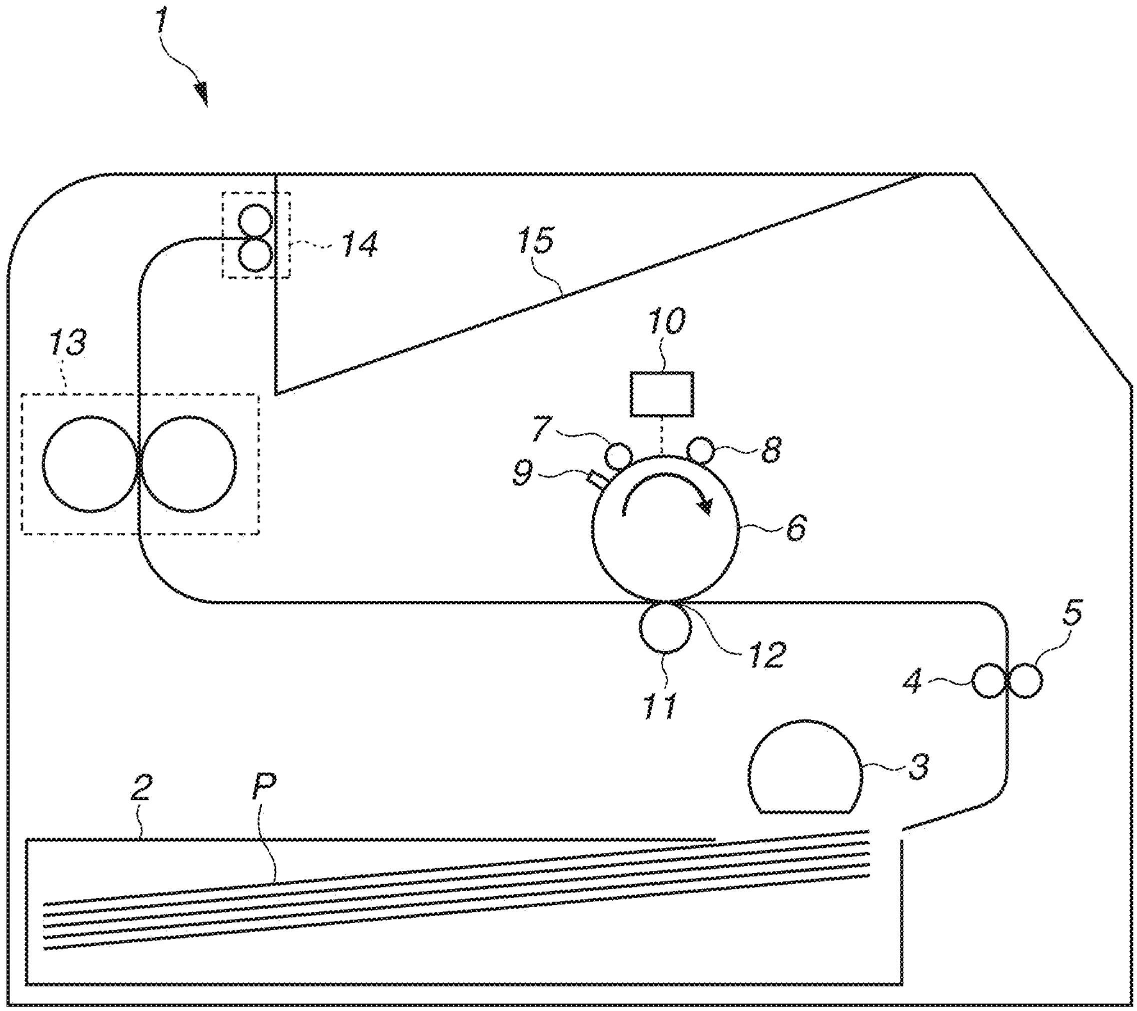
FIG. 1 is a schematic configuration diagram illustrating an image forming apparatus.

The overall configuration of a printer (image forming apparatus) 1 will be described with reference to FIG. 1. The printer 1 is a laser beam printer that scans a photosensitive member with a laser beam according to image information.

The printer 1 includes a recording material feeding unit and an image forming unit. In the recording material feeding unit, recording materials P stacked in a cassette 2 are picked up one by one from an uppermost recording material P by a sheet feeding roller 3 and are fed to a registration unit. An orientation of the recording material P is aligned by the registration unit including a registration roller 4 and a registration roller 5, and then is fed to the image forming unit.

The image forming unit includes a photosensitive member 6 that rotates in the direction indicated by an arrow, a charger 7 that charges the photosensitive member 6, and a laser scanner 10 that scans the photosensitive member 6 with laser light according to image information. The image forming unit further includes a developing device 8 that develops an electrostatic latent image formed on the photosensitive member 6 with toner, a transfer roller 11 that transfers a toner image from the photosensitive member 6 onto the recording material P, and a cleaner 9 that removes residual toner on the photosensitive member 6.

A transfer portion 12 is formed between the photosensitive member 6 and the transfer roller 11.

The recording material P to which the toner image has been transferred is conveyed to a fixing apparatus 13. The toner image on the recording material P is heated and fixed on the recording material P by the fixing apparatus 13. The recording material P that has passed through the fixing apparatus 13 is discharged to a sheet discharge tray 15 by a sheet discharge roller pair 14.

Configuration of Fixing Apparatus

Figure 2A:
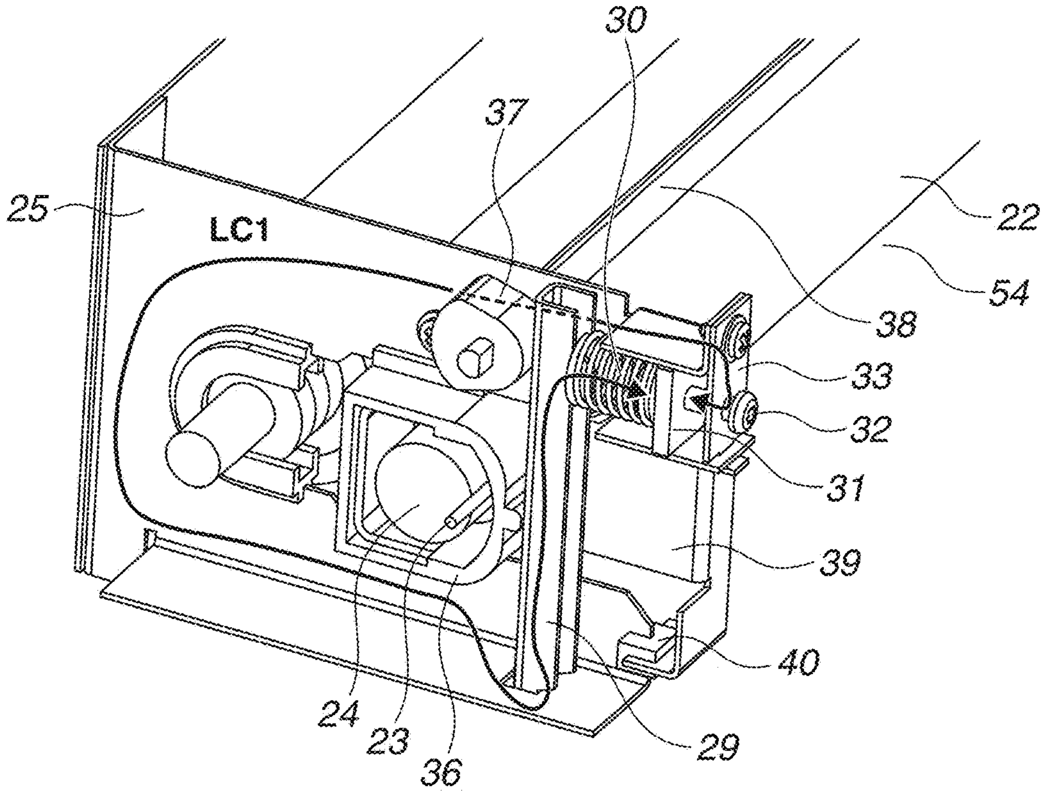
FIGS. 2A and 2B are perspective views each illustrating one end of a fixing apparatus according to a first exemplary embodiment.
Figure 2B:
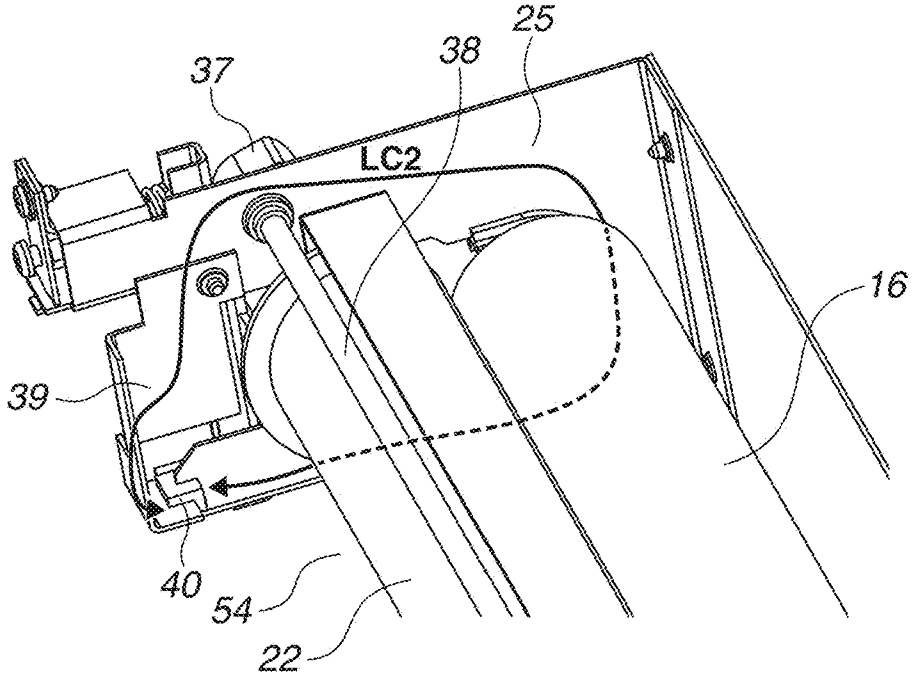
Figure 3:
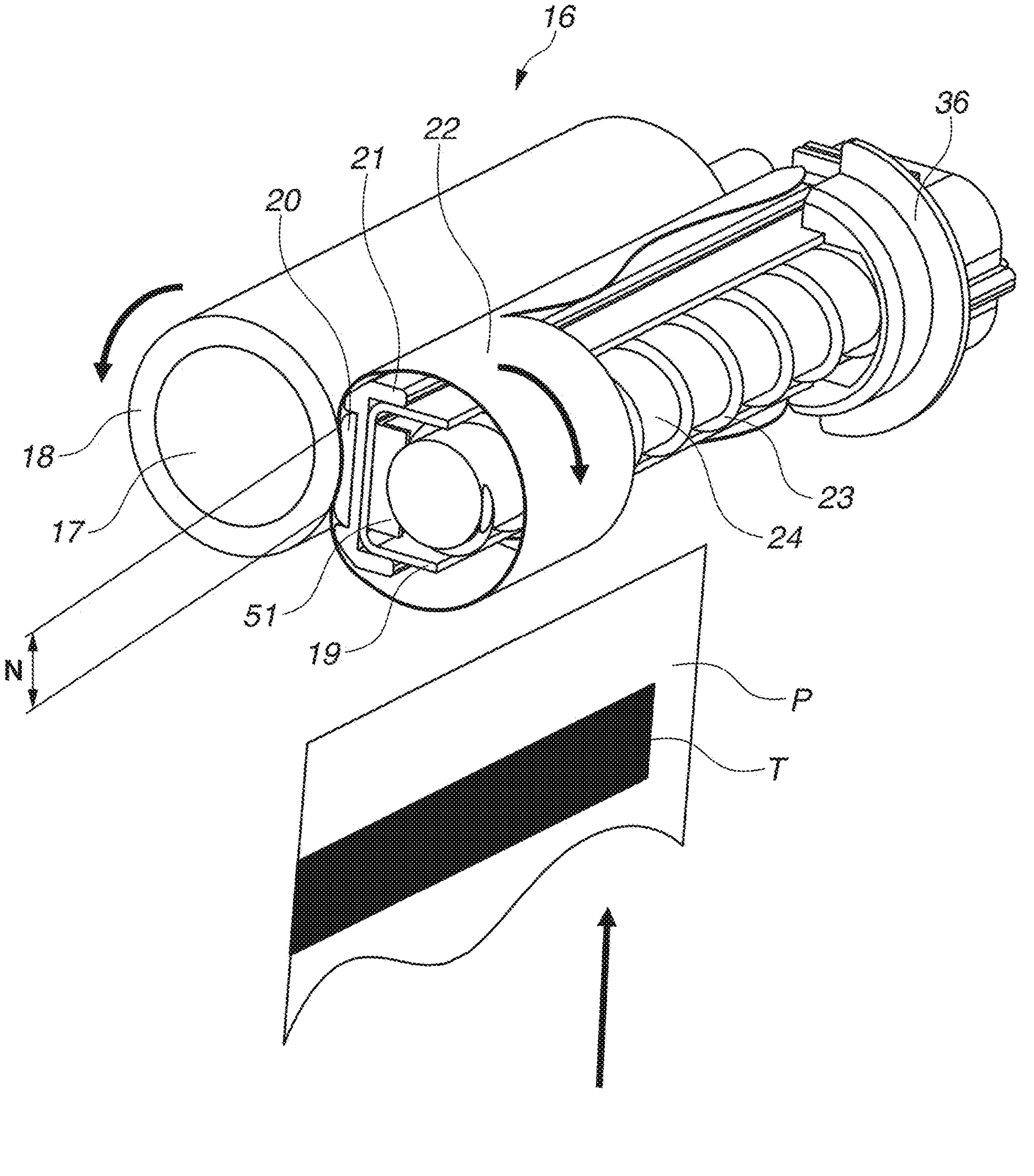
FIG. 3 is a perspective view illustrating an internal structure of a belt unit.

The fixing apparatus 13 will be described with reference to FIGS. 2A, 2B and 3. FIGS. 2A and 2B are perspective views illustrating the fixing apparatus 13, and FIG. 3 is a perspective view illustrating an internal structure of the fixing apparatus 13.

The fixing apparatus 13 includes a belt (also referred to as a film) 22 having a conductive layer, and a pressure roller (pressure member) 16 that is in contact with an outer circumferential surface of the belt 22. The belt 22 corresponds to a heating member having a cylindrical form. In a space inside the belt 22, a coil 23 having a helical structure portion whose helical axis is substantially parallel to the longitudinal direction of the belt 22 is disposed. An application of a high-frequency current to the coil 23 generates an induced current in the conductive layer of the belt 22, and the conductive layer generates heat. In a space inside the helical structure portion of the coil 23, a core 24 is disposed to guide magnetic lines of force of the alternating magnetic field. The core 24 is held by a core holding member 51 made of resin. The core holding member 51 is held by a stay 19. The stay 19 is a member that transmits a pressing force of a spring 30 to the entire part of the fixing apparatus 13 in the longitudinal direction to form a nip portion N with which the recording material P is nipped and conveyed. A sliding plate holding member 21 is disposed on a side opposite to a side with the core holding member 51 with respect to the stay 19. The sliding plate holding member 21 holds a sliding plate 20, and the belt 22 rotates and slides in contact with the sliding plate 20.

A base layer of the belt 22 is made of a heat-resistant resin, such as polyamide-imide or polyimide, and a conductive layer is formed on the base layer. The conductive layer is made of a conductive material, such as copper or silver. A protective layer is formed on the conductive layer and is made of the same heat-resistant resin as the base layer. An elastic layer made of silicone rubber or the like is formed on the protective layer, and a release layer made of fluororesin or the like is formed on the elastic layer. Because the belt 22 may have any configuration as long as the belt 22 includes the conductive layer, a heat generation layer of the belt 22 may be a member in which an elastic layer and a release layer are formed on a cylinder made of a metal, such as nickel or stainless steel. Flanges 36 disposed one each at respective ends of the belt 22 face end surfaces of the belt 22, and regulate a deviation movement of the belt 22 in the longitudinal direction. The flanges 36 each have a portion facing an inner surface of the belt 22, and guide a rotation of the belt 22. The flanges 36 are positioned and fixed with respect to the stay 19.

The pressure roller (roller) 16 includes a core shaft portion 17 and a heat-resistant elastic layer 18 made of a material such as silicone rubber. A gear is disposed at an end of the core shaft portion 17, and the pressure roller 16 rotates by the gear receiving power from a motor (not illustrated). The pressure roller 16 is in contact with an outer peripheral surface of the belt 22, and forms the nip portion N with the belt 22 to nip and convey the recording material P. The belt 22 is rotated by a rotation of the pressure roller 16.

The core 24 is a ferromagnetic body made of an oxide or an alloy having high magnetic permeability, such as a sintered ferrite, a ferrite resin, an amorphous alloy, or a permalloy. Ends of the core 24 are in the core axial direction. It is desirable that a cross-sectional area of the core 24 be as large as possible within a range in which the core 24 is accommodated in the belt 22. A form of the core 24 is not limited to a cylindrical form, and a prismatic form or the like can be applicable.

The coil 23 is made of, for example, a litz wire in which thin wire rods are twisted together. The coil 23 has the helical structure portion around the core 24 inserted in the rotation axis direction of the belt 22. An insulating heat-resistant resin (not illustrated) is interposed between the core 24 and the coil 23.

It is desirable that the stay 19 be made of a material having a high Young's modulus with which the pressing force of the spring 30 is uniformly transmitted over the nip portion N in the longitudinal direction. Using a stainless steel (SUS304) or a stainless steel (SUS316), which is a nonmagnetic material and an austenitic stainless steel, as the material of the stay 19 prevents generation of eddy currents.

It is desirable that the sliding plate holding member 21 be made of a heat-resistant resin, such as a liquid crystal polymer (LCP) or a polyphenylene sulfide (PPS). Using the heat resistant resin causes the heat of the belt 22 to be hardly transferred to the stay 19, which improves efficient use of the heat generation amount of the belt 22 in the fixing processing.

The sliding plate 20 is required to have smoothness to prevent wearing out of the inner surface of the belt 22. The sliding plate 20 is made of, for example, an aluminum alloy, a heat-resistant resin, or the like, and is a component having an improved smoothness in a surface that slides on the belt 22.

The slidability of the sliding plate 20 may be further enhanced with a surface treatment, such as fluororesin coating.

In the above-described configuration, the alternating magnetic flux generated by the high-frequency current supplied to the coil 23 is concentrated on the core 24 having high magnetic permeability, and consequently, the current is induced in the conductive layer of the belt 22 in such a manner that a magnetic flux canceling the alternating magnetic flux is formed. The induced current flows in the rotation direction of the belt 22, and Joule heating occurs in the conductive layer due to an electric resistance of the conductive layer and the induced current. After the belt 22 reaches a desired temperature, the recording material P on which a toner image T has been formed is sent to the nip portion N. The pressure roller 16 is rotationally driven by the motor (not illustrated), and the recording material P on which the toner image T has been formed is heated while being nipped and conveyed by the nip portion N, whereby the toner image T is heated and fixed on the recording material P.

Overall Configuration of Fixing Apparatus

The overall configuration of the fixing apparatus 13 in the present exemplary embodiment will be described below with reference to FIGS. 2A and 2B to FIG. 5. Side plates 25 and 26 serving as a frame of the fixing apparatus 13 are fixed to one ends of a base plate 27 and a sub-plate 28 and the other ends of the base plate 27 and the sub-plate 28, respectively. Hereinafter, while a description will be given only of a structure on a side with the side plate 25, a structure on a side with the side plate 26 is the same as the structure on the side with the side plate 25, and thus the redundant description will be omitted.

Figure 4:
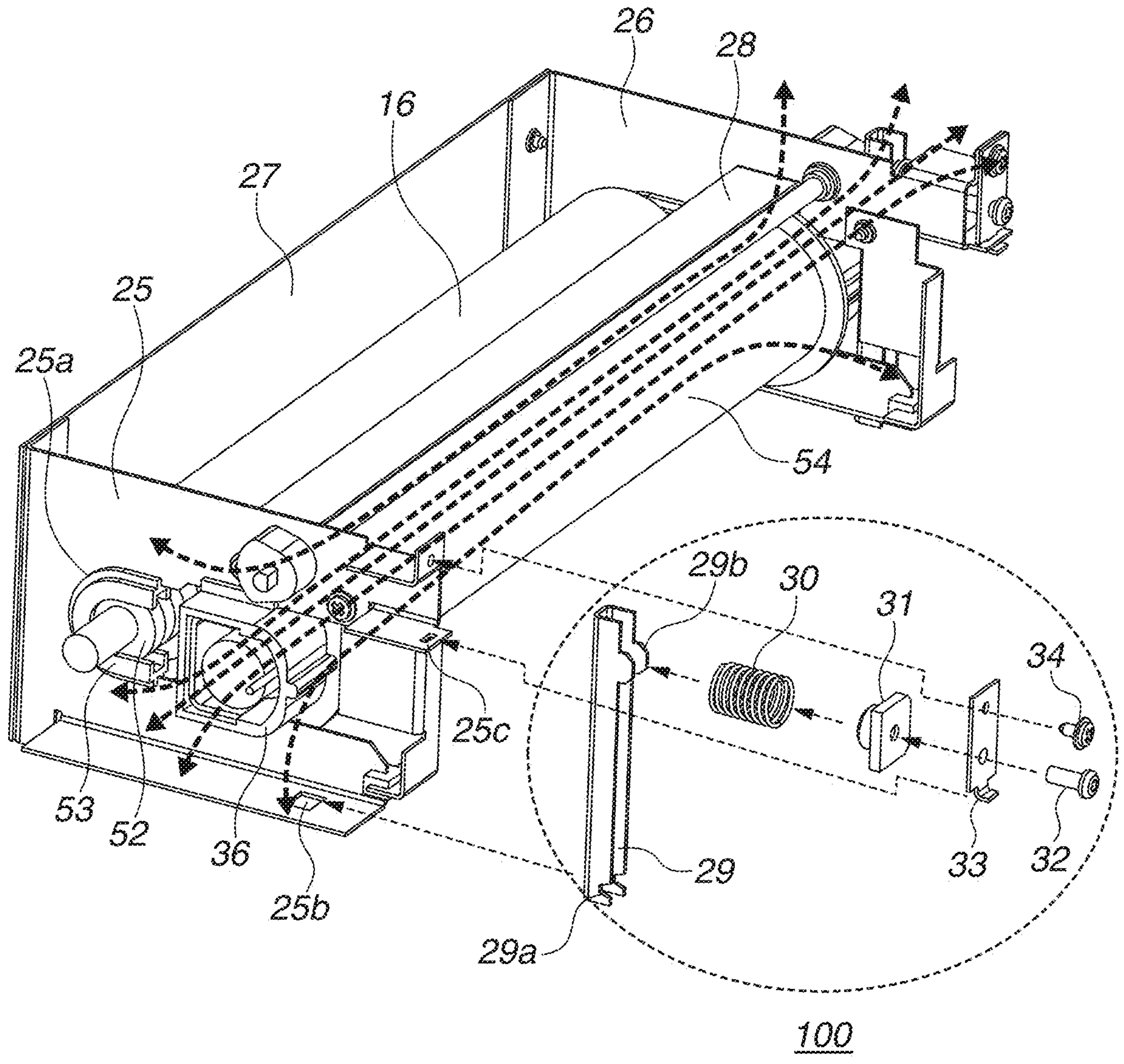
FIG. 4 is a perspective view illustrating a structure of the fixing apparatus according to the first exemplary embodiment.

As illustrated in FIG. 4, when viewed from one side in the longitudinal direction of the fixing apparatus 13, the side plate 25 has a bottom portion 25*a* having a U-shaped opening. In the assembly procedure of the fixing apparatus 13, first, the pressure roller 16 with a ball bearing 52 and a holder 53 attached to each end of the pressure roller 16 is inserted from the U-shaped opening of the side plate 25 toward the bottom portion 25*a*. Next, the belt unit (heating unit) 54 in which the belt 22 and the members in the belt 22 have been assembled into a unit is inserted into the fixing apparatus 13 in which the pressure roller 16 has been inserted. In this way, the pressure roller 16 and the belt unit 54 are positioned in the conveyance direction of the recording material P. A length between the side plates 25 and 26 is shorter than a longitudinal dimension of the core 24, for the purpose of downsizing the fixing apparatus 13 in the longitudinal direction.

A description will be given of pressing mechanisms 100. The pressing mechanism 100 are each supported by a corresponding one of the side plates 25 and 26, and each have a mechanism for pressing one of the belt unit 54 and the pressure roller 16 toward the other to form the nip portion N. A fulcrum holding portion 25*b* is formed on an upstream portion of the side plate 25 in the conveyance direction of the recording material P, and the fulcrum holding portion 25*b* swingably holds a fulcrum portion 29*a* of a pressing plate 29. At an end portion of the pressing plate 29 opposite to the other end portion having the fulcrum portion 29*a*, a spring holding portion 29*b* is formed, and the spring 30 that generates the pressing force to form the nip portion N is positioned with respect to the pressing plate 29. The spring 30 of the present exemplary embodiment is a compression spring. On a side opposite to a side with the spring holding portion 29*b* in the pressing direction of the spring 30, a spacer 31 that receives the pressing force of the spring 30 is disposed. The spacer 31 is in contact with an adjustment screw 32 in the pressing direction, and the adjustment screw 32 is rotatably held by a thread of a fixing plate 33.

The fixing plate 33 is fixed to a hook hole 25*c* of the side plate 25 by a fixing screw 34. The pressing plate 29 and the spring 30 are in a positional relationship in which the pressing plate 29 and the spring 30 are not in contact with the side plate 25 in the longitudinal direction of the fixing apparatus 13. The spacer 31 is disposed at a position where the spacer 31 is in contact with the side plate 25 in the longitudinal direction of the fixing apparatus 13, and has a role of keeping a predetermined distance between the spring 30 and the side plate 25. That is, the spacer 31 has a role of regulating the position of the spring 30 in the longitudinal direction of the fixing apparatus 13 (the axial direction of the helical axis). In the pressing mechanism 100, the pressing plate 29 generates a pressing force toward a flange 36 of the belt unit 54 with the fulcrum portion 29*a* serving as a fulcrum and the spring holding portion 29*b* serving as a point of effort. Since the compression amount of the spring 30 is adjusted by rotating the adjustment screw 32, a pressure distribution of the nip portion N is made uniform with respect to the center of the fixing apparatus 13 in the longitudinal direction.

Figure 5:
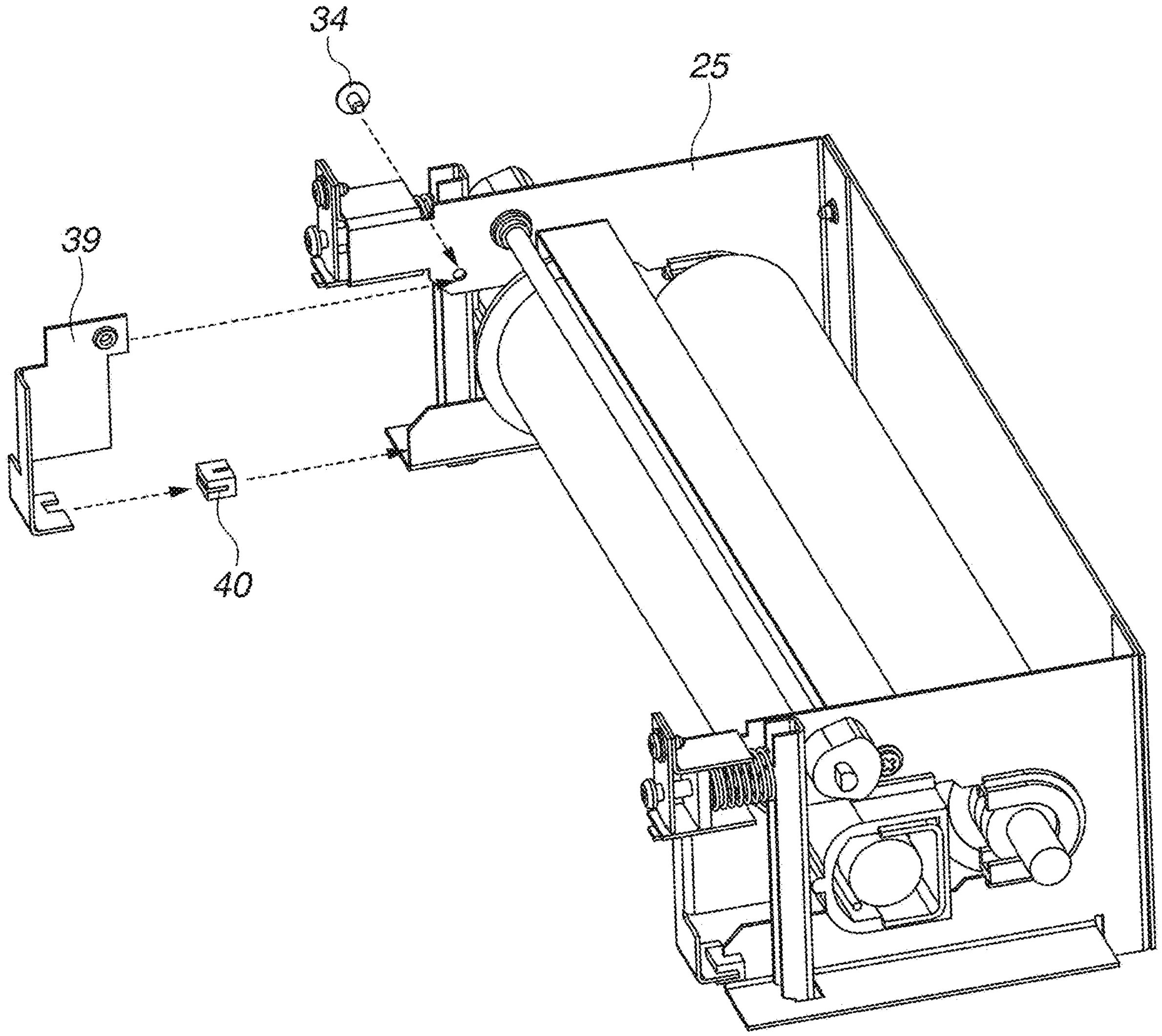
FIG. 5 is a perspective view illustrating the structure of the fixing apparatus according to the first exemplary embodiment.

As illustrated in FIG. 5, a reinforcement member 39 is attached to the U-shaped opening of the side plate 25. A cap 40 is attached to an end of the reinforcement member 39. The cap 40 is fitted to an edge of the side plate 25. The reinforcement member 39 is fixed to the side plate 25 by the fixing screw 34. The reinforcement member 39 is disposed to prevent an end portion at the U-shaped opening of the side plate 25 from being deformed in the longitudinal direction of the fixing apparatus 13 due to the pressing force of the spring 30.

A description will be given of release of the pressing force with reference to FIGS. 6A and 6B. A cam 37 serving as a pressing force adjustable member is disposed at an outer side surface of the side plate 25. The cam 37 is fixed to an end of a cam shaft 38, and the cam 37 and the cam shaft 38 are rotatably supported by the side plate 25. The cam 37 has large and small curved surface portions which are different in distance from the cam shaft 38 in its radial direction. The large curved surface of the cam 37 is a first curved surface portion 37*a*, and the small curved surface is a second curved surface portion 37*b*. The cam 37 and the cam shaft 38 are rotated in the clockwise (CW) direction by a motor (not illustrated). The phase of the cam 37 is detected by a sensor (not illustrated), and the cam 37 is rotated for a predetermined time after detection of a certain phase and then stopped.

Figure 6A:
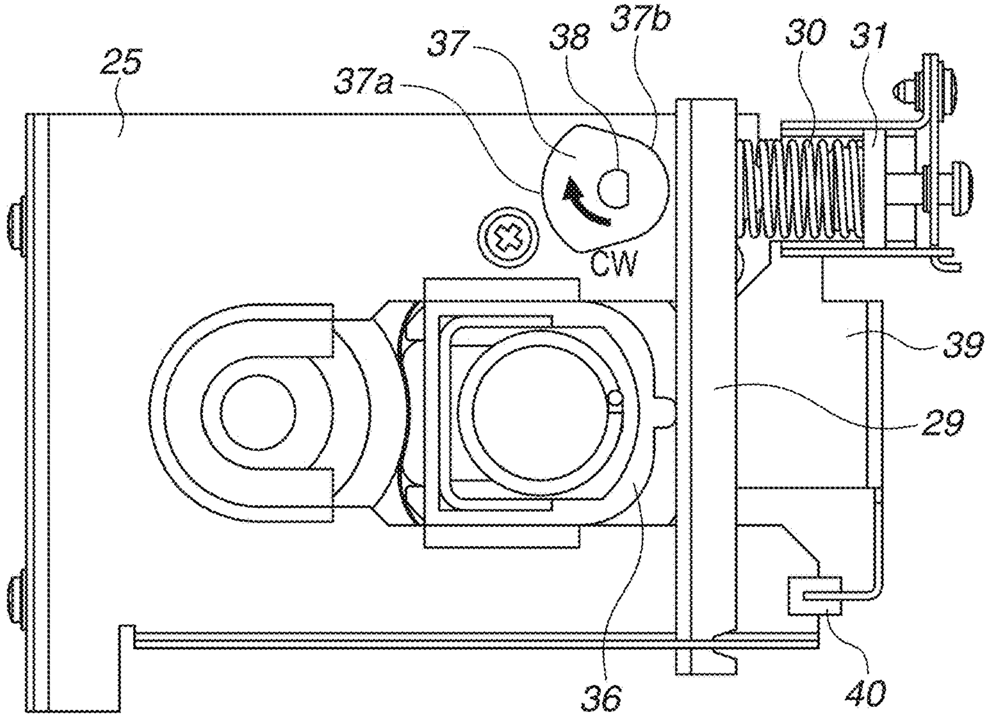
FIGS. 6A and 6B are diagrams illustrating a pressing state and a pressing release state, respectively, of the fixing apparatus according to the first exemplary embodiment.
Figure 6B:
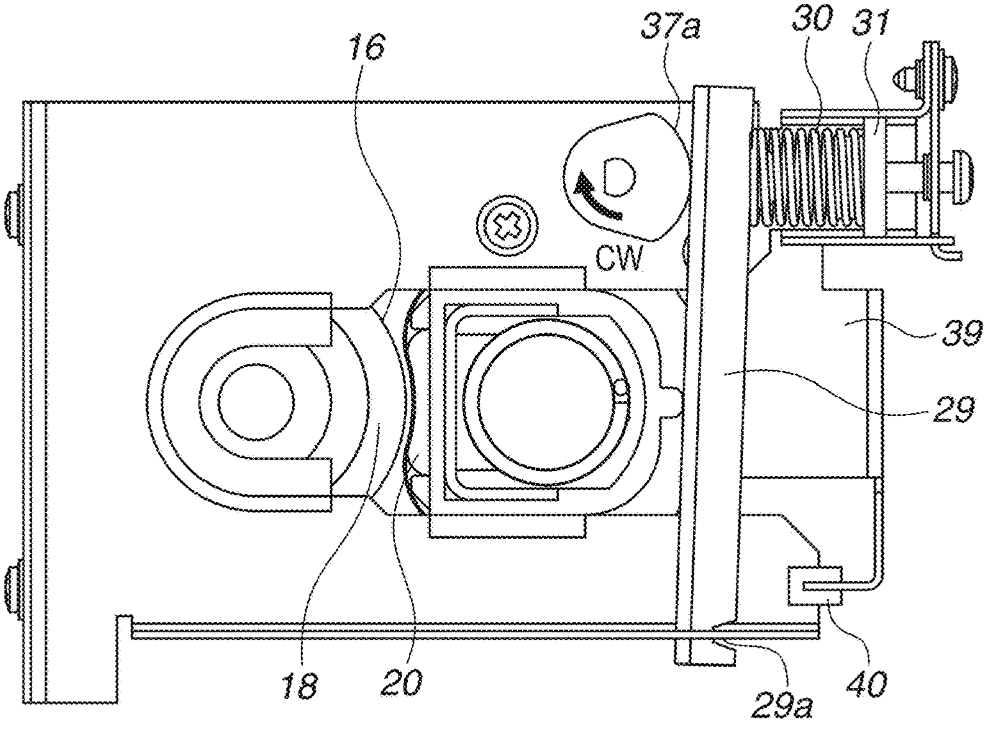

As illustrated in FIG. 6A, in a pressing state in which the pressing force of the spring 30 acts on the flange 36 of the belt unit 54, the cam 37 is in a phase in which the second curved surface portion 37*b* faces the pressing plate 29. In this phase, the second curved surface portion 37*b* and the pressing plate 29 are not in contact with each other. On the other hand, in the pressing release state in which the pressing force of the spring 30 is released as illustrated in FIG. 6B, the cam 37 is in a phase in which the first curved surface portion 37*a* and the pressing plate 29 are in contact with each other. In this phase, the heat-resistant elastic layer 18 of the pressure roller 16 is not pressed or deformed by the sliding plate 20. By releasing the pressing force, the user can easily remove the recording material P jammed in the nip portion N.

Material of Parts of Fixing Apparatus

A description will be given of materials of the various parts of the fixing apparatus 13 in the present exemplary embodiment. The base plate 27, the sub-plate 28, and the fixing plate 33 are made of a material having a high Young's modulus, such as an electrogalvanized steel plate, and are not easily deformed even by the pressing force of the spring 30. Similarly, the side plates 25 and 26 are made of a metal plate, such as an electrogalvanized steel plate. Here, as illustrated by broken line arrows (indicating magnetic fluxes) in FIG. 4, magnetic fluxes that do not pass through the core 24, among magnetic fluxes generated by the alternating magnetic field generated by the coil 23, pass through the side plates 25 and 26 in a direction perpendicular to the surfaces of the side plates 25 and 26, which causes generation of eddy currents in the side plate 25. This lowers the efficiency of induction heating in the conductive layer of the belt 22.

A metal, especially the one with high magnetic permeability, further lowers the efficiency of induction heating because eddy currents concentrate on its surface. Further, if the distance between the side plate 25 and the side plate 26 is reduced for the purpose of downsizing the fixing apparatus 13, the metal of the magnetic material having high magnetic permeability is more likely to be affected by the alternating magnetic field. Therefore, it is desirable that a SUS304, a SUS316, an aluminum alloy, or a heat-resistant resin, which are nonmagnetic materials, be used as a material of the side plates 25 and 26 to prevent generation of eddy currents. For the same reason, the members disposed in proximity to the side plate 25, such as the core shaft portion 17 of the pressure roller 16, the pressing plate 29, and the reinforcement member 39, may be made of a nonmagnetic material. If the pressing force of the spring 30 is low, the same effect is still obtainable even with the side plates 25 and 26 made of an insulating resin material instead of a metal material.

Because plate components disposed parallel to the direction of the alternating magnetic field and components disposed at positions where the magnetic flux density of the alternating magnetic field is low, such as the base plate 27, the sub-plate 28, and the fixing plate 33, are unlikely to generate eddy currents, these components may be made of a magnetic material. It is desirable that the spring 30 be made of a stainless steel wire, such as a piano wire, rather than a steel wire. The spacer 31 and the cap 40, which are the feature of the present exemplary embodiment, are made of a heat-resistant and insulating resin material, such as a PPS or an LCP, and may be made of an insulating resin material having low heat resistance if the temperature is low. The cam 37 is made of a resin material, such as polyacetal (POM) or polyamide (PA) to have slidability to the pressing plate 29.

The configuration of the present exemplary embodiment leads to achievement of a reduction in a heat generation loss in the conductive layer of the belt 22 as well as downsizing of the fixing apparatus 13. A description will be given with reference to the perspective views of one end side of the fixing apparatus 13 illustrated in FIGS. 2A and 2B.

When viewed in the axial direction of the helical axis of the coil 23, if the side plate 25 and the pressing mechanism 100 form a loop-shaped conductive path surrounding the coil 23, an induced current induced in such a manner that magnetic fluxes of the alternating magnetic field are cancelled out flows through the side plate 25 and the pressing mechanism 100. The induced current flowing through the side plate 25 and the pressing mechanism 100 reduces the heat generation efficiency of the conductive layer of the belt 22.

In the present exemplary embodiment, the spacer 31 is made of an insulating resin material, that is, the spacer 31 is made of an insulating member, so that a loop-shaped conductive path LC1 (first conductive path) passing through the side plate 25 and the pressing mechanism 100 is electrically interrupted at the position of the spacer 31. The spacer 31, which is an insulating member, is disposed on the side opposite to the side with the pressing plate 29 of the spring 30, and is disposed at a portion where the spacer 31 receives a reaction force of the pressing force of the pressing mechanism 100. Similarly, the cap 40 (second insulating member) made of an insulating resin material is interposed between the side plate 25 and the reinforcement member 39, so that a loop- shaped conductive path LC2 (second conductive path) passing through the side plate 25 and the reinforcement member 39 is electrically interrupted at the position of the cap 40. With this configuration, since the induced currents indicated by arrows illustrated in FIGS. 2A and 2B are not generated, a loss in the heat generation efficiency of the conductive layer of the belt 22 is prevented. As described above, the fixing apparatus 13 includes the spacer 31 of an insulating material to electrically interrupt the loop-shaped conductive path LC1, so that the loop-shaped conductive path LC1 passing through the side plate 25 and the pressing mechanism 100 in a form surrounding the coil 23 when viewed in the axial direction of the helical axis is not formed. The fixing apparatus 13 also includes the cap 40 of an insulating material to electrically interrupt the loop-shaped conductive path LC2, so that the loop-shaped conductive path LC2 passing through the side plate 25 and the reinforcement member 39 in a form surrounding the coil 23 when viewed in the axial direction of the helical axis is not formed.

Further, according to the present exemplary embodiment, an impact noise that is caused by the spring 30 when the state of the fixing apparatus 13 changes from the pressing release state to the pressing state is able to be reduced. A force length of the spring 30 in the pressing release state (FIG. 6B) is shorter than a force length of the spring 30 in the pressing state (FIG. 6A). Consequently, when the state of the fixing apparatus 13 is changed from the pressing release state to the pressing state, a force of the spring 30 causing the cam 37 to rotate in the CW direction in FIG. 6B acts on the cam 37. As a result, a gear train (not illustrated) transmitting a driving force to the cam 37 is rotated by an amount equivalent to the backlash, and the spring 30 is instantaneously expanded. By an impact of the spring 30 being expanded, a large sound is generated. In particular, as for the support members, such as the side plate 25, the material is made of a metal, that is, a conductive material, in order to increase the rigidity of the fixing apparatus 13. In terms of solid-borne sound, a material having a higher density, such as a metal, is more likely to transmit sound and generate impact sound. Therefore, a resin member is used as the spacer 31 of the pressing mechanism 100 to reduce the density of the spacer 31 to be smaller than that of a case using a metal material, whereby the solid-borne sound is reduced, that is, the impact noise is reduced. In the present exemplary embodiment, the spacer 31 in contact with the spring 30 is made of a resin member, which is highly effective in reducing the impact noise.

In addition to the method of interrupting the conductive path with the spacer 31 made of an insulating resin member, a member made of the same insulating resin material as the spacer 31 may be interposed between the fulcrum holding portion 25*b* of the side plate 25 and the fulcrum portion 29*a* of the pressing plate 29. Further, an insulating resin member may be interposed between the spring 30 and the spring holding portion 29*b* of the pressing plate 29. An insulating resin member may be interposed in a portion receiving the reaction force of the pressing force. A plurality of insulating members may be interposed in one conductive path.

Next, a description will be given of a fixing apparatus according to a second exemplary embodiment. Components having the same configuration and the same function as those in the first exemplary embodiment are denoted by the same reference numerals, and the redundant descriptions will be omitted.

Pressing Mechanism of Fixing Apparatus

Figure 7A:
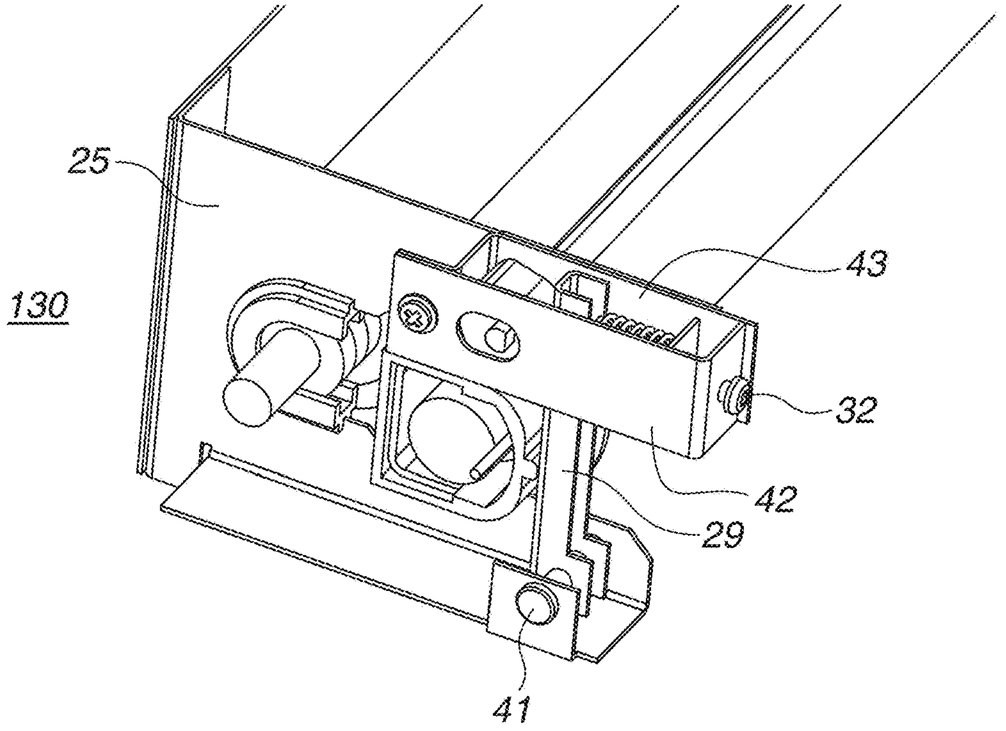
FIGS. 7A and 7B are perspective views each illustrating a structure of a fixing apparatus according to a second exemplary embodiment.
Figure 7B:
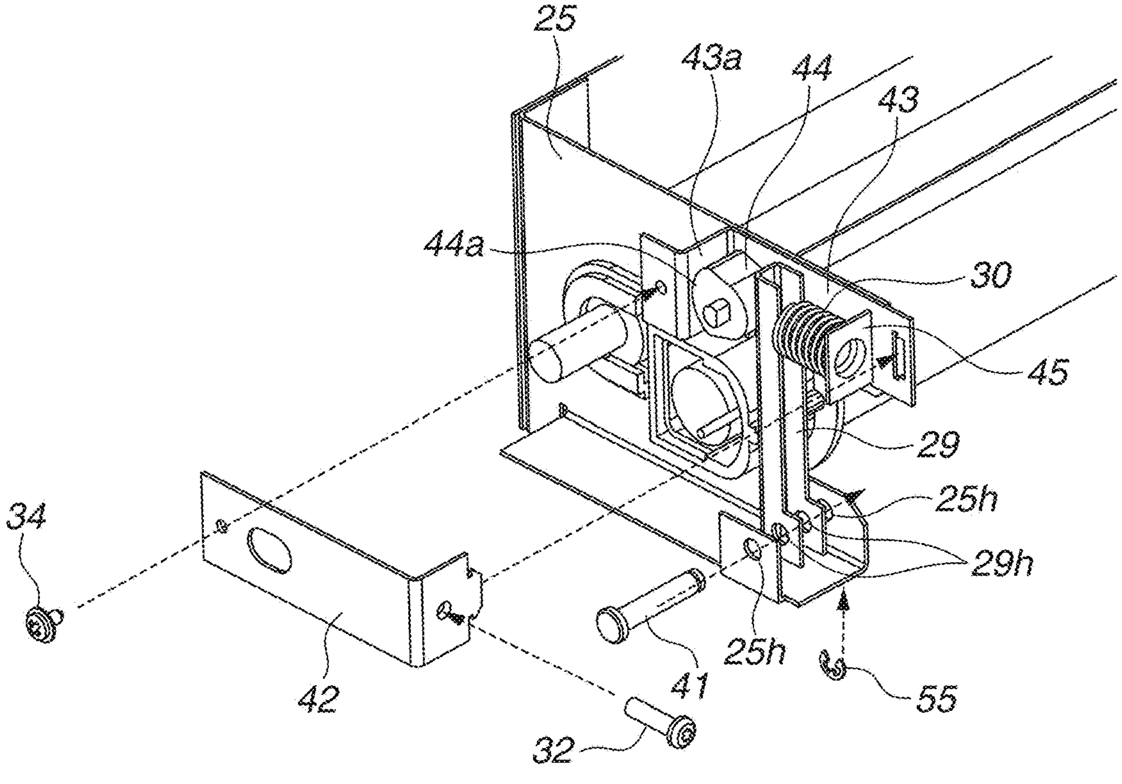

FIGS. 7A and 7B are perspective views illustrating a fixing apparatus 130 in the present exemplary embodiment. As illustrated in FIG. 7A, a support shaft 41 is fitted to the side plate 25. The support shaft 41 is removable and is inserted into a fitting hole 25*h* of the side plate 25 and fitting holes 29*h* of the pressing plate 29 which are coaxially aligned. With this configuration, the pressing plate 29 is rotatably supported about the support shaft 41 with respect to the side plate 25.

FIG. 7B is an exploded perspective view of a portion of a pressing mechanism of the fixing apparatus 130. An E-ring 55 is fixed to the support shaft 41 to prevent the support shaft 41 from coming off from the fitting hole 25*h* and the fitting holes 29*h*. A movable plate 43 is a crank-shaped member and has a cam sliding portion 43*a* that slides on a cam 44. The movable plate 43 slides with respect to the side plate 25 in the compression direction of the spring 30. The movable plate reinforcement member 42 has a screw thread for rotatably supporting the adjustment screw 32. Similarly to the first exemplary embodiment, the compression amount of the spring 30 is adjustable by rotation of the adjustment screw 32 via a spacer 45, so that the pressure applied to the nip portion N is finely adjusted.

The pressing mechanism of the fixing apparatus 130 will be described in detail with reference to FIG. 8. A movable shaft 46 is crimped to the movable plate 43. The movable shaft 46 slides on an inside surface of a long hole of a movable shaft sliding member 47 fixed to the side plate 25. The movable shaft sliding member 47 slides on the movable shaft 46 in the lateral direction. The length of the long hole of the movable shaft sliding member 47 in the longitudinal direction is longer than a length of a movable area of the movable plate 43. The longitudinal direction of the movable shaft sliding member 47 is parallel to the compression direction of the spring 30. A side plate sliding member 48 is attached to the movable plate 43. The side plate sliding member 48 has a cam sliding portion 48*a* and a side plate sliding portion 48*b*. The cam sliding portion 48*a* is a long hole, and in the lateral direction of the long hole, the cam sliding portion 48*a* slides on the cam 44. The length of the long hole in the longitudinal direction is longer than the length of the movable area of the movable plate 43. The longitudinal direction of the cam sliding portion 48*a* is parallel to the compression direction of the spring 30. The side plate sliding portion 48*b* slides on a plane of the side plate 25.

In the assembly of these parts, first, the movable plate 43 to which the side plate sliding member 48 has been attached is attached to the side plate 25 in the longitudinal direction of the fixing apparatus 130 in such a manner that the movable shaft 46 enters the long hole of the movable shaft sliding member 47. A washer 49 and an E-ring 50 are attached to an end of the movable shaft 46, whereby the movable plate 43 is fixed in the longitudinal direction of the fixing apparatus 130. The washer 49 has a larger outer diameter than the E-ring 50. The surface of the washer 49 slides on the movable shaft sliding member 47 but not sliding on the side plate 25. Next, the cam 44 is inserted into the cam shaft 38 in such a manner that the cam 44 enters the long hole (cam sliding portion 48*a*) of the side plate sliding member 48.

A description will be given of a pressing state and a pressing release state of the above described pressing mechanism with reference to FIGS. 9A and 9B. In the pressing state, the cam sliding portion 43*a* of the movable plate 43 and a first curved surface portion 44*a* of the cam 44 are in contact with each other, which causes the pressing force of the spring 30 to be transmitted to the belt unit 54 through the pressing plate 29. In this state, there is a clearance between a second curved surface portion 44*b* of the cam 44 and the pressing plate 29, and the pressing force of the spring 30 is transmitted to the belt unit 54 without loss.

Next, a description will be given of the pressing release state. When the cam 44 is rotated in the CW direction from the phase in which the cam 44 is in the pressing state, the second curved surface portion 44*b* of the cam 44 and the cam sliding portion 43*a* come into contact with each other. In this phase, the movable plate 43 moves in the direction in which a force length of the spring 30 extends due to a force with which the force length of the spring 30 extends. Further, in this phase, the first curved surface portion 44*a* of the cam 44 and the pressing plate 29 are in contact with each other, and the pressing plate 29 rotates about the support shaft 41 to a position where the pressing plate 29 is in the pressing release state. The force length of the spring 30 is longer in the pressing release state than in the pressing state.

The pressing mechanism of the present exemplary embodiment sets the force length of the spring 30 to be longer in the pressing release state than in the pressing state. Therefore, the impact noise that is caused by the spring 30 is reduced as compared with the first exemplary embodiment. A description will be given of an example case in which the radius of the first curved surface portion 44*a* is 10 mm, the radius of the second curved surface portion 44*b* is 7 mm, and the clearance from the second curved surface portion 44*b* to the pressing plate 29 in the phase in which the cam 44 is in the pressing state is 1 mm. When the cam 44 rotates from the pressing state to the pressing release state, the pressing plate 29 moves by 2 mm in the direction in which the spring 30 is compressed, by the first curved surface portion 44*a*. Meanwhile, the movable plate 43 comes into contact with the second curved surface portion 44*b* and moves by 3 mm in a direction in which the spring 30 is released. As a result, the spring 30 is released by 1 mm in switching from the pressing state to the pressing release state. Further, increasing phase positions of the cam 44 allows the fixing apparatus 130 to have a mode in which a pressing force lower than that in the pressing state is generated and a mode in which a pressing force higher than that in the pressing state is generated. That is, variations of the pressure that is applied to the nip portion N increases, whereby functions of, for example, the low curl mode and the high gloss mode are able to be provided to the user.

A description will be given of materials of the components of the fixing apparatus 130. The support shaft 41, the movable plate 43, the movable plate reinforcement member 42, the spacer 45, and the movable shaft 46 are made of a metal material, and are desirably made of a nonmagnetic metal. The spacer 31 of the first exemplary embodiment is made of an insulating resin material, but the spacer 45 of the present exemplary embodiment is made of a metal material, whereby a more space in the compression direction of the spring 30 is kept in comparison with the first exemplary embodiment. With this configuration, the degree of freedom of the spring constant of the spring 30 increases.

In the first exemplary embodiment, the loop-shaped conductive paths LC1 and LC2 are electrically interrupted by using insulating members for the spacer 31 and the reinforcement member 39. In the present exemplary embodiment, the cam 44, the movable shaft sliding member 47, and the side plate sliding member 48 are insulating members, and thus loop-shaped conductive paths LC3 and LC4 are electrically interrupted. Since the cam 44, the movable shaft sliding member 47, and the side plate sliding member 48 are all required to have slidability, a resin material, such as POM or PA, is used.

Figure 9A:
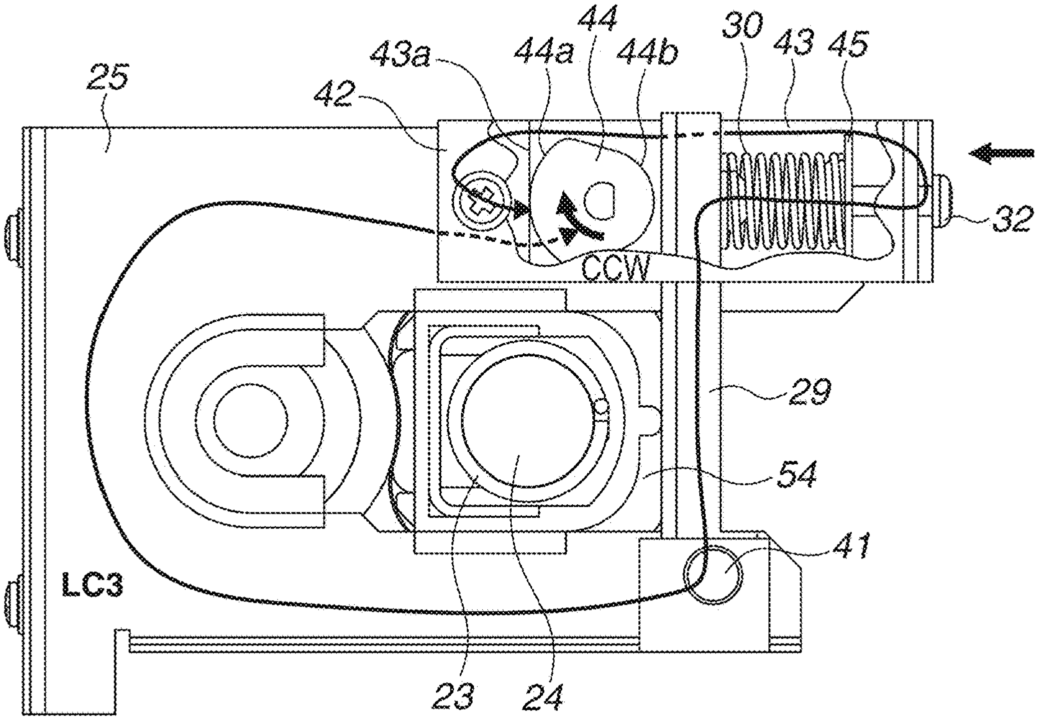
FIGS. 9A and 9B are diagrams illustrating a pressing state and a pressing release state, respectively, of the fixing apparatus according to the second exemplary embodiment.
Figure 9B:
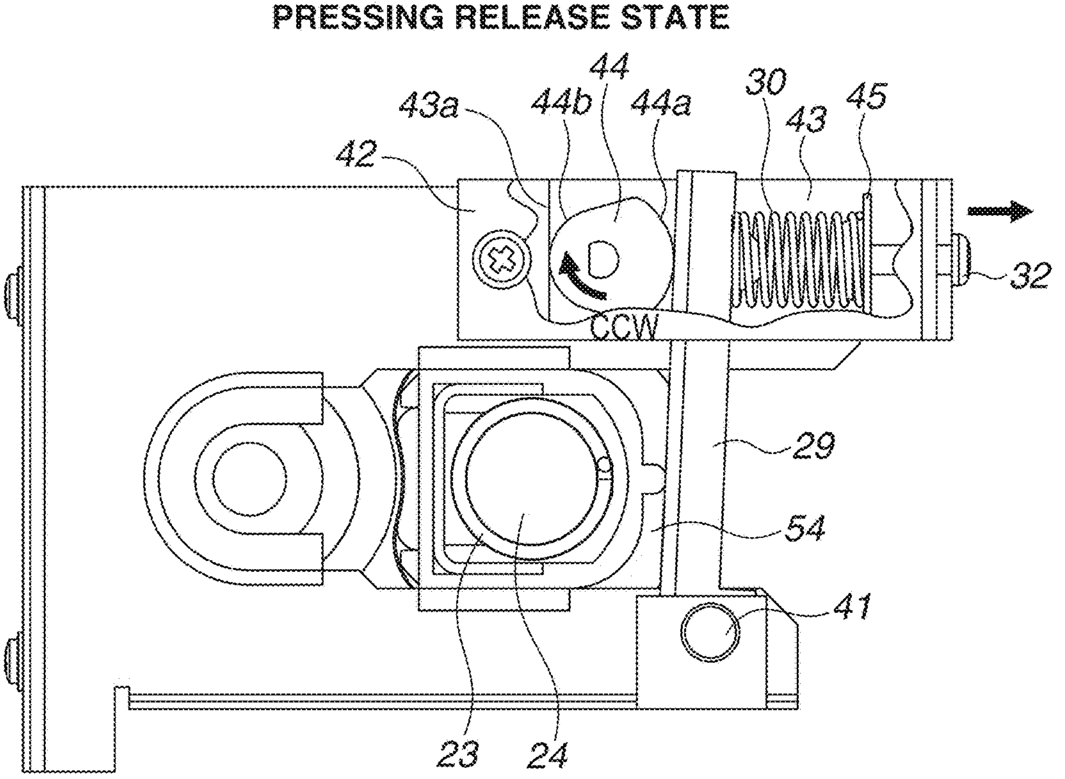

As illustrated in FIG. 9A, when viewed in the axial direction of the helical axis, the side plate 25, the support shaft 41, the pressing plate 29, the spring 30, the spacer 45, the adjustment screw 32, the movable plate reinforcement member 42, the movable plate 43, and the cam 44 are disposed. Since the cam 44 is made of an insulating resin member, the loop-shaped conductive path LC3 is electrically interrupted. With this configuration, an induced current is prevented. Further, as in the first exemplary embodiment, the cam 44 reduces the impact noise of the spring 30.

Figure 8:
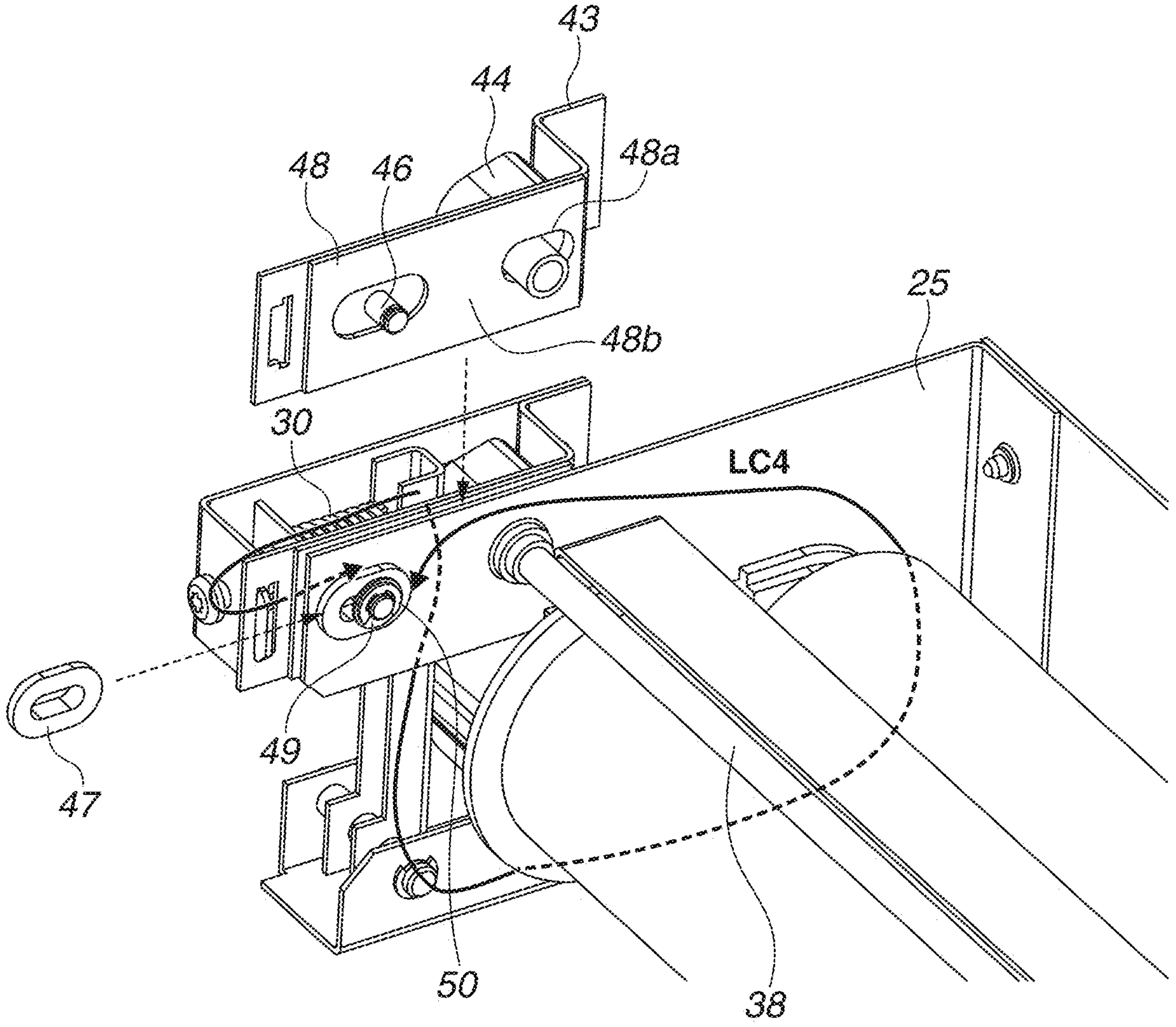
FIG. 8 is a perspective view illustrating one end of the fixing apparatus according to the second exemplary embodiment.

As illustrated in FIG. 8, since the side plate 25 and the movable plate 43 are made of a metal material, the movable shaft sliding member 47 and the side plate sliding member 48 are made of an insulating resin material. This configuration prevents the loop-shaped conductive path LC4 from being formed in a path of the side plate 25, the support shaft 41, the pressing plate 29, the spring 30, the spacer 45, the adjustment screw 32, the movable plate reinforcement member 42, and the movable plate 43. Further, a sliding noise of the pressing mechanism 100 that is generated at the time of switching between the pressing state and the pressing release state is reduced. For example, in switching from the pressing state to the pressing release state, the movable plate 43 moves in a direction in which the force length of the spring 30 extends with respect to the side plate 25. In movement of the movable plate 43, the movable shaft sliding member 47 slides on the washer 49 and the movable shaft 46, and the side plate sliding member 48 slides on the side plate 25, so that sliding between the metal materials is avoided, which reduces the sliding noise.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-077715, filed May 10. 2023, which is hereby incorporated by reference herein in its entirety.

What is claimed is:

1. A fixing apparatus to fix a toner image on a recording material, the fixing apparatus comprising:

a heating unit, the heating unit includes a cylindrical belt contacting the recording material, the cylindrical belt has a conductive layer, a coil disposed in an inner space of the cylindrical belt, the coil includes a helical structure portion having a helical axis substantially parallel to a longitudinal direction of the cylindrical belt, and the coil is configured to generate an alternating magnetic field to generate an induced current in the conductive layer, a core disposed in an inner space of the helical structure portion and configured to guide magnetic lines of force of the alternating magnetic field, a stay disposed in the inner space of the cylindrical belt and configured to transmit a pressing force to an entirety of the heating unit in the longitudinal direction of the belt, and a flange disposed at a position facing an end surface of the cylindrical belt and configured to guide the belt, the flange is positioned relative to the stay;

a pressure roller configured to be in contact with an outer circumferential surface of the cylindrical belt and form a nip portion between the pressure roller and the cylindrical belt to nip and convey the recording material;

a frame made of metal, the frame includes a side plate formed with a U-shaped opening for supporting the heating unit and the pressure roller;

a support shaft fitted in a fitting hole of the side plate and fitting holes of a pressing plate so that the pressing plate is supported so as to be pivotable about the support shaft with respect to the side plate, the pressing plate being configured to press the flange toward the pressure roller to form the nip portion;

a spring configured to apply the pressing force to the pressing plate in a compression direction of the spring;

a movable plate arranged at the side plate and configured to move relative to the side plate in the compression direction of the spring;

a movable shaft fixed to the movable plate;

a movable shaft sliding member fixed to the side plate and having a long hole extending in the compression direction of the spring, the movable shaft being received in and slidable along the long hole of the movable shaft sliding member;

a movable plate reinforcement member fixed to the movable plate and having a screw thread;

an adjustment screw threaded in the movable plate reinforcement member and configured to adjust a compression amount of the spring so as to adjust the pressing force applied to the pressing plate;

a side-plate sliding member attached to the movable plate, the side-plate sliding member having a cam sliding portion and a side-plate sliding portion, the cam sliding portion being formed as a long hole extending in the compression direction of the spring and being slidable on a cam, and the side-plate sliding portion being slidable on a plane of the side plate; and a cam fixed to a cam shaft supported by the side plate and configured to contact the cam sliding portion of the movable plate and a portion of the pressing plate so that rotation of the cam changes a force length of the spring and a position of the pressing plate between a pressing state and a pressing release state, wherein the movable shaft sliding member and the side-plate sliding member are made of an electrical insulating material so as to interrupt a looping conductive path that would otherwise pass through the side plate, the support shaft, the pressing plate, the spring, a spacer, the adjustment screw, the movable plate reinforcement member, and the movable plate, when viewed in the axial direction of the helical axis.

2. The fixing apparatus according to claim 1, wherein the spacer is disposed on a side of the spring opposite to a side on where the pressing plate is provided in a pressing force apply direction of the spring, at a position receiving a reaction force of the pressing force of the spring, and configured to regulate an axial position of the spring.

3. The fixing apparatus according to claim 1, wherein the cam is made of an electric insulator so as to interrupt a looping conductive path that would otherwise pass through the side plate, the support shaft, the pressing plate, the spring, the spacer, the adjustment screw, the movable plate reinforcement member, the movable plate, and the cam, when viewed in the axial direction of the helical axis.

* * * * *